: 3,787,361
Patented Jan. 22, 1974

3,787,361
PROCESS FOR PRODUCTION OF POLY-
PHENYLENE OXIDE COMPOUNDS
Seizo Nakashio, Nishinomiya, Toshio Takemura, Kyoto, and Takashi Maruyama, Kunio Ota, and Tetsuki Seto, Takatsuki, Japan, assignors to Sumitomo Chemical, Limited, Osaka, Japan
No Drawing. Continuation of abandoned application Ser. No. 97,372, Dec. 11, 1970. This application July 7, 1972, Ser. No. 269,551
Claims priority, application Japan, Dec. 16, 1969, 44/101,434
Int. Cl. C08g 23/18
U.S. Cl. 260—47 ET                          23 Claims

ABSTRACT OF THE DISCLOSURE

A process is provided in which polyphenylene oxide polymers are readily prepared in high yields by oxidative polymerization of phenols with oxygen in the presence of a novel ternary catalyst system composed of a manganese compound, a primary amine, and an alcohol. Compared with polymers obtained with known catalysts, the present polymer has narrower molecular weight distribution and is thermally more stable and more resistant to oxidation so that no special stabilizing treatment is necessary. The polymer shows improvement in creep resistance, dimensional stability, environmental stress cracking, etc.

---

This is a continuation of application Ser. No. 97,372, filed Dec. 11, 1970, and now abandoned.

The present invention relates to a process for producing polyphenylene oxide compounds, and more particularly to a process for oxidative polymerization of phenols by oxygen in the presence of a ternary catalyst system comprising a manganese compound, a primary amine, and an alcohol.

Recently, because of its excellent physical and chemical properties, polyphenylene oxide has been attracting much attention.

Heretofore, in preparing polyphenylene oxide by the oxidative polymerization of phenols, it is known that copper salt-tertiary amine complex (Japanese patent publication No. 18,692/61), manganese salt-tertiary amine complex (Japanese patent publication No. 3,195/67), manganese salt-amine complex (U.S. Pat. No. 3,337,501), cobalt salt-amine complex (Japanese patent publication No. 4,673/67), etc., may be used as a catalyst for oxidative polymerization of phenols. Also, as a three-component catalyst containing an alcohol, a catalyst system comprising cuprous salt-tertiary amine-alcohol was proposed (U.S. Pat. No. 3,384,619).

As a result of research on the oxidative polymerization of phenols, the present inventors had found the following facts:

The processing characteristics of polyphenylene oxide are adversely affected by the presence of quinones which are formed as byproducts during the oxidative polymerization of phenols. By reducing the formation of quinones, polymers having desirable properties can be obtained. For this purpose, manganese or cobalt salt-amine complex is more suitable than copper salt-tertiary amine complex, while with respect to the rate of polymerization cobalt salt-amine complex is far inferior to manganese salt-amine complex.

On the other hand, concerning the manganese salt-amine complex it has been known that tertiary amines are suitable as the amine component of the complex, as shown in U.S. Pat. No. 3,337,501 beside Japanese patent publication No. 3,195/67. In said U.S. Pat. No. 3,337,501 there is found no example in which a manganese salt-primary amine complex is used as the catalyst.

As a result of further study, the present inventors have found the following new facts:

In the case where a catalyst system containing a primary amine as the amine component of the manganese salt-amine complex is used for the oxidative polymerization of phenols, when the procedure of the above-said known process is followed the reaction would not occur at all, or even if the reaction should occur only a very low molecular weight polyphenylene oxide is obtained in an extremely low yield. Such a low molecular weight polyphenylene oxide is unsuitable as a resin for technological reasons. The present inventors have found a catalyst system of high activity composed of a manganese compound, a primary amine and an alcohol for producing a high molecular weight polyphenylene oxide, quite unlike the above-said catalyst system which has no activity or a very low activity if it has any.

Further it was found that the catalyst system of the present invention has not only a high polymerization activity but also the following characteristics:

In the production of polyphenylene oxide, when use is made of as a monomer a phenol having such substituents as alkyl, hydrocarbonoxy, or the like, which are oxidizable with relative ease by oxygen in the presence of a transition metal, such as, for example, 2,6-xylenol, 2-methyl-6-methoxyphenol, or the like, these substituents are partly oxidized during the polymerization into hydroperoxide, hydroxyl, or aldehyde groups which cause an enhanced gel-formation and deterioration in flow characteristics during processing of the polyphenylene oxide. The presence of an alcohol in the polymerization system might be considered undesirable because of the danger of accelerating the oxidation of said substitutent groups. However, with the catalyst system of the present invention none of such difficulties was observed.

A narrow distribution of molecular weight is preferred for polyphenylene oxide in order that such important physical properties for an engineering resin as creep resistance, softening point, warp-proofness or dimensional stability, and environmental stress-cracking resistance may not be deteriorated. The presence of an alcohol in the polymerization system might be considered undesirable because of the apprehension of widening the molecular weight distribution. However, it was found that the polyphenylene oxide prepared with the catalyst system of the present invention has a characteristic of having a narrow molecular weight distribution.

Further, it was found that one of the characteristics of the polyphenylene oxide prepared according to the present invention is an excellent thermal stability.

Although excellent as an engineering resin, polyphenylene oxide has suffered from poor oxidation resistance. When this polymer is exposed to high temperatures in the presence of oxygen, a relatively rapid thermal oxidation sets in, causing discoloration, deterioration in flow characteristics due to cross-linking between polymer molecules, or decrease in strengths due to reduction in molecular weight by depolymerization. Hence, there have been proposed various stabilizing methods such as those described in Japanese patent publication No. 4,277/67, U.S. Pats. Nos. 3,375,228, 3,392,146, 3,402,143 and 3,424,722. However, it was found that the polyphenylene oxide, which was prepared according to the present invention and not subjected to such a stabilizing treatment, shows neither discoloration nor deterioration in flow characteristics or in strength when exposed to high temperatures.

While the reasons for such excellent properties of the polyphenylene oxide prepared according to the present invention have not yet been made clear, the present inventors believe that as compared with polyphenylene oxide resins prepared with the above-said known catalysts, that prepared according to the present invention has not only different molecular weight distribution but also partly different structure. One of the reasons for such belief is based on the fact that there exists a difference in degree of oxidation of the substituent groups between the polyphenylene oxide prepared by the present process and those prepared with known catalysts, in case of the polymerization of phenols having substituent groups such as alkyl or hydrocarbonoxy which are susceptible to relatively rapid oxidation by oxygen in the presence of a transition metal. Another reason is based on the fact that whereas in the conventional polyphenylene oxide there are found beside principal terminal group (I) two other byproduced terminal groups (II) and (III) which adversely affect the physical properties, whereas in the polyphenylene oxide prepared according to the present invention there is found none of such terminal groups (II) and (III).

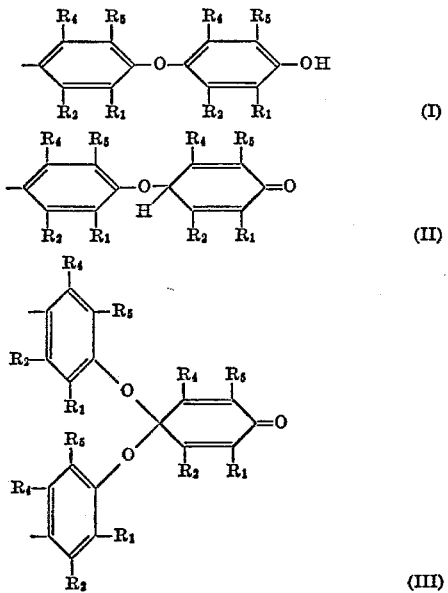

The present invention provides a process for producing a high molecular weight polyphenylene oxide with desirable properties in a high yield of industrial significance.

The catalyst used in the present invention for the oxidative polymerization of phenols is a manganeseamine complex composed of a manganese compound, a primary amine, and an alcohol. It is interesting that contrary to the prior knowledge a primary amine can be a component of the catalyst system for the oxidative polymerization of phenols, and the resulting catalyst is capable of producing a high molecular weight polymer with excellent thermal stability in high yields without accompanying phenomena that are anticipated to occur when an alcohol is present in the polymerization system.

Although the exact structural form of the catalyst of this invention, which is composed of a manganese compound, a primary amine, and an alcohol, has not been fully clarified up to the present, it is industrially significant to provide a novel catalyst for the polymerization of phenols, which has such a high catalytic activity and which is, at the same time, capable of producing a polymer with desirable physical properties.

The present invention provides a process for producing polyphenylene oxide compounds, which comprises reacting phenols having the general formula,

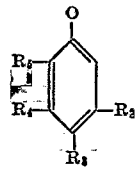

wherein $R_1$, $R_2$, $R_3$, $R_4$ and $R_5$ each are a hydrogen atom or a halogen atom or a hydrocarbon, a halogen-substituted hydrocarbon, a hydrocarbonoxy, or a halogen-substituted hydrocarbonoxy group, which have $C_1$–$C_7$ carbon atoms, wherein at least one of $R_1$, $R_2$, $R_3$, $R_4$ and $R_5$ being a hydrogen atom and at least one thereof being other than a hydrogen atom, with oxygen in the presence of a ternary catalyst system composed of a manganese compound, a primary amine and an alcohol. Examples of $R_1$, $R_2$, $R_3$, $R_4$ and $R_5$ are hydrogen, chlorine, bromine and iodine atom, and methyl, ethyl, propyl, vinyl, allyl, phenyl, benzyl, α - methylbenzyl, chloromethyl, bromoethyl, methoxy, chloromethoxy, ethoxy, phenoxy groups, etc.

Representative examples of the phenols used in the present invention include 2-methylphenol,
2-ethylphenol,
2-cyclohexylphenol,
2-methyl-4-chlorophenol,
2-methyl-4-bromophenol,
2-methyl-4-chloro-6-bromophenol,
2-chloroethylphenol,
2,3,5-trimethylphenol,
2-benzylphenol,
2-phenylphenol,
2-chlorophenol,
2-chlorophenylphenol,
2-methoxyphenol,
2-ethoxyphenol,
2,5-dimethoxyphenol,
2-methyl-5-ethoxyphenol,
2-chloroethoxyphenol,
4-methylphenol,
4-ethylphenol,
2-chloro-4-methylphenol,
4-chlorophenylphenol,
4-methoxyphenol,
4-bromoethylphenol,
2,6-dimethylphenol,
2,6-diethylphenol,
2,6-dipropylphenol,
2,6-dimethoxyphenol,
2,6-diallylphenol,
2,3,6-trimethylphenol,
2,6-diethoxyphenol,
2-methoxy-6-ethoxyphenol,
2,6-di(chlorophenoxy)phenol,
2,6-dimethyl-3-chlorophenol,
2,3-dimethyl-4-chlorophenol,
2,6-di(chloroethyl)phenol,
2,6-diphenylphenol,
2-methyl-6-phenylphenol,
2,6-di(chloropropyl)phenol,
2-allyl-6-methylphenol,
2,6-di(2',4'-dichlorophenoxy)phenol,
2-chlorophenol,
2-bromophenol,
4-bromophenol,
3-chlorophenol,
2-chloro-4-bromophenol,
3-methyl-4-chlorophenol,
2,5-dimethylphenol,
3,5-dimethyl-2,4-dichlorophenol, etc. These phenols may be used singly, or may be used in an admixture of homologous phenols to produce copolymers.

Examples of the manganese compound used in the present invention include: manganese halides (e.g., manganese chloride, manganese bromide, etc.); salts with oxy-acids (e.g., manganese sulfate, basic manganese carbonate, manganese nitrate, manganese thiocyanate, manganese perchlorate, manganese chlorate, manganese periodate, manganese acetate, manganese formate, manganese succinate, manganese monochloroacetate, etc.); manganous acid, manganic acid, permanganic acid and salts of these acids (e.g., potassium permanganate, sodium permanganate, barium permanganate, sodium manganate, copper manganate, potassium manganite, cadmium manganite, etc.); alkoxides (e.g., manganese methoxide, manganese ethoxide, manganese butoxide, etc.); oxygen complexes (e.g., sodium manganese acetylacetonate, ammonium manganese acetylacetonate, thallium manganese oxalate, manganese salicylate, manganese monoethylacetonedicarboxylate, manganese acetylacetonate, manganese acetoacetate monoethyl ester, etc.); various complex salts (e.g., sodium manganese sulfate, cerium manganese nitrate, ammonium manganese nitrite, manganese ammine chloride, ammine manganese carbonate, etc.); solvated complexes (i.e., manganese chloride-ethanol, manganese bromide-phenol, etc.). It is preferable that at least catalytic amounts of these compounds are dissloved in the primary amine or/and the alcohol, of which the catalyst is to be composed.

The primary amines used in the present invention are aliphatic or alicyclic amines, which may have unsaturated or substituted hydrocarbon group, and may include amines having more than two amino groups. The substiuted groups include halogen, hydroxyl, nitro, cyano, isocyano, amino, acyl, acyloxy, hydrocarbonoxy, etc. The number of carbon atoms in the hydrocarbon groups of these amines is 1 to 18, preferbaly 1 to 8. Representative examples of these amines include methylamine, ethylamine, n-propylamine, isopropylamine, n-butylamine, isobutylamine, sec-butylamine, tert-butylamine, amylamine, n-hexylamine, cyclohexylamine, 4-methylcyclohexylamine, octylamine, stearylamine, allylamine, benzylamine, p-chlorobenzylamine, ethanolamine, p-nitrobenzylamine, p-cyanobenzylamine, p-isoocyanobenzylamine, ethylenediamine, diethylenetriamine, 1,3-diaminopropane, 1,4-diaminobutane, hexamethylenediamine, $\beta$-acetylethylamine, $\beta$-acetoxyethylamine, $\beta$-methoxyethylamine, etc. These amines are used singly or in combinations.

The alcohols used in the present invention include cyclic, non-cyclic, or heterocyclic alcohols which may be unsubstituted or substituted, and include polyhydric alcohols. The substituents groups include halogen, hydroxyl, nitro, cyano, amino, sulfo, thiocyano, isothiocyano, isocyano, thiocarbonyl, carbonyl, carboxyl, acyl, acyloxy, hydrocarbono, substituted hydrocarbono, hydrocarbonoxy, substituted, hydrocarbonoxy, thiohydrocarbonoxy, substituted thiohydrocarbonoxy, etc. The number of carbon atoms in these alcohols, is 1 to 15, preferably 1 to 8.

Representative examples of these alcohols include methanol, ethanol, n-propyl alcohol, isopropyl alcohol, n-butyl alcohol, isobutyl alcohol, sec-butyl alcohol, tert-butyl alcohol, amyl alcohol, n-hexyl acohol, octyl alcohol, lauryl alcohol, allyl alcohol, benzyl alcohol, cyclohexyl, alcohol, ethylene glycol, trimethylene glycol, butanediol, glycerine, pinacol, $\beta$-chloroethanol, p-nitrobenzyl alcohols, p-cyanobenzyl alcohol, p,p'-dimethyloldiphenyl sulfone, methyl-$\beta$-oxyethyl sulfone, $\beta$-hydroxyethyl thiocyanate, hydroxybutyl isothiocyanate, p-methylolphenyl isocyanate, methyl $\beta$-hydroxyethyl ketone, methyl $\beta$-hydroxyethyl thioketone, $\beta$-hydroxypropionic acid, p-acetylbenzyl alcohol, p-acetamidomethylbenzyl alcohol, $\beta$-hydroxyethylacetic acid, $\beta$-aminoethyl alcohol, $\beta$-ethoxyethyl alcohol, methoxyethyl alcohol, monothioethylene glycol, hydroxyethylpyridine, etc. These alcohols may be used singly or in mixtures.

In the catalyst system of the present invention, which is composed of a manganese compound, a primary amine, and an alcohol, manganese, compounds are used in an amount of generally 0.05 to 30 mole percent, preferably 0.1 to 10 mole percent per mole of the monomer. Primary amines are used in an amount of, in general, 1 to 500 moles per mole of the manganese compound. However, primary amines may also be used as a reaction medium, in which case there is no upper limit to their amount. Alcohols are used in an amount of generally 1 to 1000 moles per mole of the manganese compound. However, alcohols may also be used as a reaction medium, in which case there is no upper limit to the amount to be used.

As oxygen, pure oxygen or air may be used. When air is used, the rate of reaction becomes low, but may be satisfactorily used for practical operation. The introduction of oxygen-containing gas into a reaction mixture is carried out ordinarily by blowing method. When a highly oxygen-enriched gas is used and vigorous stirring or liquid circulation or other means are used to maintain a good gas-liquid contact, it is not necessary to vent the residue of the introduced gas to the outside of the system, and it is also not necessary to use a blowing method.

The oxidative polymerization of phenols in the present invention can be carried out, even in the absence of a reaction medium, but it is generally possible and more preferable in view of easy control of reaction conditions and easy treatment of reaction products, to conduct the oxidative polymerization in the presence of a reaction medium. As the medium, any known reaction medium may be used as long as the medium is inert to the phenols which is in liquid state at the reaction temperature, and does not influence the catalyst except for solvation or solvent action. Examples of such reaction media include aliphatic, cycloaliphatic, and aromatic hydrocarbons and derivatives thereof, such as, nitro derivatives, halogen derivatives, ethers, ketones, lactones, sulfonated derivatives, etc. Examples of reaction media generally used include heptane, benzene, toluene, xylene, monochlorobenzene, dichlorobenzenes, nitrobenzene, methylcyclohexane, dichloromethane, dichloroethanes, chloroform, diethyl ether, tetrahydrofuran, dioxane, cyclohexanone, ethyl acetate, propiolactone, acetonitrile, etc. The amount of a reaction medium is used in an amount of 1 to 100 times by weight of the phenol monomer. Such reaction media need not be used in case, the above-said primary amines or alcohols are used as a component of the catalyst as well as a reaction medium.

In the present process, as the reaction proceeds water is formed as a byproduct. Removal of the water is helpful for preventing the formation of quinones and other by-products and for increasing the yield or the molecular weight of polyphenylene oxide. For this purpose, usual dehydration techniques which will not inactivate the polymerization catalyst system may be employed, for example, passing a dry gas through the reaction mixture, or including in the reaction mixture a dehydrating agent (e.g., sodium sulfate, calcium sulfate, magnesium sulfate, magnesium perchlorate, potassium carbonate, barium oxide, calcium oxide, potassium hydroxide, sodium hydroxide, or the like).

Any reaction temperature may be used so long as the reaction medium is kept in a liquid state at the reaction temperature. However, in order to prevent side reaction, the reaction temperature is usually below 150° C., preferably in the range of 0° to 100° C.

The reaction pressure is generally atmospheric pressure or slightly superatmospheric pressure, though it can be more increased, or reduced to subatmospheric pressure.

After completion of the reaction, the resulting reaction mixture is put into a non-solvent for the formed polyphenylene oxide compound. The polyphenylene oxide compound is thereby deposited and separated. This is an ordinary method of recovering the polymer, while other suitable methods can be used.

The present invention is illustrated hereunder with reference to examples, but these examples are a mere embodiment of the present invention, which may be modified without departing from the spirit of the present invention, defined in annexed claims.

EXAMPLE 1

Into a four-necked flask equipped with a thermometer, a reflux condenser, a dropping funnel, a stirrer, and a gas-introducing tube, were charged 107.4 g. of xylene and 7.3 g. of ethanolamine. To the mixture was added with stirring 40.0 g. of a methanol solution containing 1.00 g. of manganese(II) chloride, and oxygen was introduced therein at room temperature for 15 minutes. Subsequently, a solution containing 48.9 g. of 2,6-xylenol and 48.9 g. of xylene was charged in the flask, and while introducing oxygen the reaction was allowed to proceed with stirring at 30° C. for 5 hours. The reaction mixture was poured into a large volume of methanol containing a small amount of hydrochloric acid, and the precipitates formed were collected by filtration, washed with methanol, then with water, and dried to obtain 47.2 g. of a white powder of a polymer having an intrinsic viscosity of 0.62 dl./g. as measured in chloroform at 25° C. The polymer was found to be of the polyphenylene oxide type from the infrared spectrum which showed strong absorptions due to the ether grouping at 1190 cm.$^{-1}$ and 1015 cm.$^{-1}$; absorptions due to a phenyl grouping at 1600 cm.$^{-1}$ and 1470 cm.$^{-1}$.

EXAMPLE 2

In the same reactor as used in Example 1 were charged 1.51 g. of manganese(II) chloride, a primary amine (Table 1), an alcohol (Table 1), xylene (Table 1) and 48.9 g. of 2,6-xylenol. In a manner similar to that in Example 1, the reaction was carried out while introducing oxygen and the reaction product was treated. For comparison, the reaction and after-treatment were repeated except that alcohols were not used. The polymerization conditions and the results obtained are as shown in Table 1. Table 1 shows the fact that a catalyst system composed of only a manganese compound and a primary amine has no or very low activity whereas the catalyst system composed of a manganese compound, a primary amine, and an alcohol has high activity.

The molecular weight distribution of each of the above-obtained polymers was measured by a gel permeation chromatograph (Waters Co., Type 200). The results obtained are shown in Table 2 as a ratio of weight-average molecular weight, $M_w$, to number-average 1 molecular weight, $M_n$.

TABLE 2

|  | $M_w/M_n$ |
|---|---|
| Polymer of the present invention | 2.1 |
| Reference polymer 1 | 3.1 |
| Reference polymer 2 | 2.0 |
| Reference polymer 3 | 5.2 |

The number of hydroxyl groups in polyphenylene oxide was measured according to the Verley method to obtain the results as shown in Table 3.

TABLE 3

|  | Hydroxyl group, percent by weight |
|---|---|
| Polymer of the present invention | 0.07 |
| Reference polymer 1 | 0.21 |
| Reference polymer 2 | 0.51 |
| Reference polymer 3 | 0.71 |

The film of 0.05 mm. in thickness which is prepared from a solution of polyphenylene oxide in chloroform was heated under an oxygen atmosphere at 226° C. for 30 minutes, and then extracted with chloroform for 10 hours in a Soxlet extractor. The ratio of the weight of film after extraction to that before extraction is referred to as gel formation ratio of the polymer. The results obtained were as shown in Table 4.

TABLE 1

| Number | Primary amine, grams | Alcohol, grams | Xylene, grams | Polymerization conditions Temp., °C. | Time, min. | Yield, percent by wt. | Intrinsic viscosity, dl./g. |
|---|---|---|---|---|---|---|---|
| 1 | n-Hexylamine, 36.4 | Ethanol, 35.0 | 195 | 30 | 300 | 94.1 | 0.58 |
| 2 (comparative example) | do | None | 195 | 30 | 500 | 0 |  |
| 3 | n-Butylamine, 23.4 | Methanol, 35.0 | 195 | 30 | 330 | 89.3 | 0.56 |
| 4 (comparative example) | do | None | 195 | 30 | 330 | 4.5 | 0.05 |
| 5 | n-Propylamine, 21.2 | Methanol, 35.0 | 195 | 30 | 300 | 95.2 | 0.64 |
| 6 (comparative example) | do | None | 195 | 30 | 300 | 9.5 | 0.07 |
| 7 | Isopropylamine, 21.2 | Ethanol, 35.0 | 195 | 30 | 300 | 93.2 | 0.55 |
| 8 (comparative example) | do | None | 195 | 30 | 300 | 0 |  |
| 9 | Ethanolamine, 11.0 | Methanol, 37.0 | 187 | 30 | 300 | 94.5 | 0.73 |
| 10 (comparative example) | do | None | 187 | 30 | 300 | 0 |  |
| 11 | Ethylenediamine, 21.6 | Methanol, 46.7 | 187 | 30 | 300 | 97.3 | 0.85 |
| 12 (comparative example) | do | None | 187 | 30 | 300 | 0 |  |

EXAMPLE 3

Example 1 was repeated on a scale enlarged 2 times, to obtain 94.9 g. of a polyphenylene oxide having an intrinsic viscosity of 0.60 dl./g.

For comparison, following polymers were synthesized: Into 600 g. of toluene were added 2 g. of cuprous chloride, 110 g. of pyridine, and 100 g. of 2,6-xylenol. Polymerization was carried out at 25° to 40° C. while introducing oxygen, and the reaction product was treated as in Example 1 to obtain a polyphenylene oxide having an intrinsic viscosity of 0.65 dl./g. (reference polymer 1). Into 4 l. of benzene were charged 5 g. of manganese chloride, 23.4 g. of tetramethylethylenediamine, 12 g. of magnesium sulfate, and 122 g. of 2,6-xylenol. Polymerization was conducted at 60° C. and the reaction product was treated as in Example 1 to obtain a polyphenylene oxide having an intrinsic viscosity of 0.22 dl./g. (reference polymer 2). Into 1 l. of toluene were added 6 g. of cupric chloride, 300 g. of n-propyl alcohol, 400 g. of triethylamine, and 100 g. of 2,6-xylenol. Polymerization was conducted at 25° to 40° C. while introducing oxygen, and the reaction product was treated as in Example 1 to obtain a polyphenylene oxide having an intrinsic viscosity of 0.63 dl./g. (reference polymer 3).

TABLE 4

|  | Gel formation ratio, percent |
|---|---|
| Polymer of the present invention | 43 |
| Reference polymer 1 | 89 |
| Reference polymer 3 | 96 |

The polyphenylene oxide was pressed at 280° C. under a pressure of 100 kg./cm.$^2$ for 10 minutes to prepare a pressed sheet of 1 mm. in thickness. The lightness of the pressed sheet was measured by a color difference meter (Nippon Denshoku Kogyo Co., Type ND–KS) to compare the degree of discoloration. The pressed sheet was heated in air at 200° C. for 20 hours and again the lightness was measured by a color difference meter to compare the degree of discoloration after heating. The results obtained are as shown in Table 5.

TABLE 5

|  | Degree of discoloration— | |
|---|---|---|
|  | Before heating | After heating |
| Polymer of the present invention | 80 | 75 |
| Reference polymer 1 | 24 | 15 |
| Reference polymer 3 | 52 | 31 |

The intrinsic viscosity of the polyphenylene oxide was measured in toluene at 25° C. before and after the toluene solution was heated at 80° C. for 30 minutes to compare the degree of depolymerization of the polyphenylene oxide when heated in toluene solution. The results obtained are as shown in Table 6.

TABLE 6

|  | Before heating, dl./g. | After heating, dl./g. |
|---|---|---|
| Polymer of the present invention | 0.60 | 0.59 |
| Reference polymer 1 | 0.65 | 0.53 |
| Reference polymer 2 | 0.22 | 0.20 |
| Reference polymer 3 | 0.63 | 0.52 |

EXAMPLE 4

Example 1 was repeated except that 17.9 g. of cyclohexylamine was used in place of 7.3 g. of ethanolamine, and 45.0 g. of methanol was used, to obtain 45.6 g. of poly(2,6-dimethyl-1,4-phenylene oxide) having an intrinsic viscosity of 0.56 dl./g. as measured in chloroform at 25° C.

EXAMPLE 5

In the same reactor as that used in Example 1 were charged 33.3 g. of a methanol solution containing 30% of methylamine (10.0 g. as methylamine), 11.7 g. of methanol, 1.51 g. of manganese(II) chloride, and 195 g. of xylene. Then oxygen was introduced therein with stirring at room temperature for 15 minutes. Subsequently a monomer solution containing 48.9 g. of 2,6-xylenol dissolved in 48.9 g. of xylene was charged into the flask and the reaction was allowed to proceed at 30° C. for 5 hours while introducing oxygen with stirring. The reaction mixture was treated in a manner similar to that in Example 1 to obtain 45.1 g. of poly(2,6-dimethyl-1,4-phenylene oxide) having an intrinsic viscosity of 0.58 dl./g. as measured in chloroform at 25° C.

EXAMPLE 6

23.2 grams of a methanol solution containing 70% of ethylamine (16.2 g. as ethylamine) was charged into the same reactor as that used in Example 1, and thereto was added with stirring 31.3 g. of a methanol solution containing 1.51 g. of manganese(II) chloride and 97 g. of xylene. After introducing oxygen into the flask at room temperature for 15 minutes, a solution of 48.9 g. of 2,6-xylenol in 48.9 g. of xylene was added thereto. The reaction was allowed to proceed at 30° C. for 5 hours while introducing oxygen with stirring. The reaction mixture was treated in a manner similar to that in Example 1 to obtain 45.1 g. of poly(2,6-dimethyl-1,4-phenylene oxide) having an intrinsic viscosity of 0.58 dl./g. as measured in chloroform at 25° C.

EXAMPLE 7

Into the same reactor as that used in Example 1 were charged 2.03 g. of anhydrous manganese(II) sulfate, 36.6 g. of methanol, 9.77 g. of ethanolamine, and 97.7 g. of xylene. After introducing oxygen into the flask with stirring at room temperature for 30 minutes, a monomer solution containing 48.9 g. of 2,6-xylenol dissolved in 48.9 g. of xylene was added thereto. The reaction was allowed to proceed with stirring at 30° C. for 5 hours while introducing oxygen. The reaction mixture was treated in a manner similar to that in Example 1 to obtain 45.5 g. of poly(2,6-dimethyl-1,4-phenylene oxide) having an intrinsic viscosity of 0.57 dl./g. as measured in chloroform at 25° C.

EXAMPLE 8

Example 7 was repeated except that in place of 2.03 g. of anhydrous manganese(II) sulfate 2.08 g. of anhydrous manganese(II) acetate was used, to obtain 46.3 g. of poly(2,6-dimethyl-1,4-phenylene oxide) having an intrinsic viscosity of 0.82 dl./g. as measured in chloroform at 25° C.

EXAMPLE 9

Into the same reactor as that used in Example 1 were charged 18.7 g. of a methanol solution containing 30% of methylamine (5.6 g. as methylamine), 23.5 g. of methanol, 1.90 g. of potassium permanganate, and 97.7 g. of xylene. After introducing oxygen into the flask with stirring at room temperature for 10 minutes, a monomer solution containing 48.9 g. of 2,6-xylenol dissolved in 48.9 g. of xylene was added thereto. The reaction was allowed to proceed with stirring at 30° C. for 5 hours under an oxygen pressure which was higher than atmospheric pressure by 30 mm. Hg. The reaction mixture was treated in a manner similar to that in Example 1 to obtain 45.2 g. of poly(2,6-dimethyl-1,4-phenylene oxide) having an intrinsic viscosity of 0.62 dl./g. as measured in chloroform at 25° C.

EXAMPLE 10

Example 1 was repeated except that in place of 48.9 g. of 2,6-xylenol a mixture of 24.5 g. of 2,6-xylenol and 24.5 g. of 2,5-xylenol was used to obtain 44.6 g. of a copolymer of 2,6-dimethyl-1,4-phenylene oxide and 2,5-dimethyl-1,4-phenylene oxide having an intrinsic viscosity of 0.59 dl./g. as measured in chloroform at 25° C.

EXAMPLE 11

Example 1 was repeated except that in place of 48.9 g. of 2,6-xylenol a mixture of 39.0 g. of 2,6-xylenol and 8.7 g. of O-cresol was used to obtain 43.9 g. of a copolymer of 2,6-dimethyl-1,4-phenylene oxide with 2-methyl-1,4-phenylene oxide having an intrinsic viscosity of 0.55 dl./g. as measured in chloroform at 25° C.

What is claimed is:

1. A process for producing polyphenylene oxide compounds which comprises reacting phenols selected from the group consisting of 2-methylphenol, 2-ethylphenol, 2-cyclohexylphenol, 2-methyl-4-chlorophenol, 2-methyl-4-bromophenol, 2-methyl-4-chloro-6-bromophenol, 2-chloroethylphenol, 2,3,5-trimethylphenol, 2-benzylphenol, 2-phenylphenol, 2-chlorophenol, 2-chlorophenylphenol, 2-methoxyphenol, 2-ethoxyphenol, 2,5-dimethoxyphenol, 2-methyl-5-ethoxyphenol, 2-chloroethoxyphenol, 4-methylphenol, 4-ethylphenol, 2-chloro-4-methylphenol, 4-chlorophenylphenol, 4-methoxyphenol, 4-bromoethylphenol, 2,6-dimethylphenol, 2,6-diethylphenol, 2,6-dipropylphenol, 2,6-dimethoxyphenol, 2,6-diallylphenol, 2,3,6-trimethylphenol, 2,6-diethoxyphenol, 2-methoxy-6-ethoxyphenol, 2,6 - di(chlorophenoxy)phenol, 2,6-dimethyl-3-chlorophenol, 2,3-dimethyl-4-chlorophenol, 2,6-di(chloroethyl)phenol, 2,6-diphenylphenol, 2 - methyl-6-phenylphenol, 2,6-di(chloropropyl)phenol, 2-allyl-6-methylphenol, 2,6-di(2',4'-dichlorophenoxy)phenol, 2-chlorophenol, 2-bromophenol, 4-bromophenol, 3-chlorophenol, 2-chloro-4-bromophenol, 3-methyl-4-chlorophenol, 2,5-dimethylphenol, 3,5-dimethyl-2,4-dichlorophenol, and mixtures thereof with oxygen
in the presence of a ternary catalyst system composed of a
manganese compound selected from the group consisting of manganese chloride, manganese bromide, manganese sulfate, manganese acetate, manganese formate, manganese propionate, potassium permanganate and sodium permanganate,
a primary amine selected from the group consisting of ethanolamine, ethylenediamine, methylamine, ethylamine, propylamine, butylamine, amylamine, hexylamine and cyclohexylamine, and
an alcohol selected from the group consisting of methanol, ethanol and ethyleneglycol.

2. A process according to claim 1, wherein the phenol is 2,6-xylenol.

3. A process according to claim 1, wherein the phenol is a mixture of 2,6-xylenol and 2,5-xylenol.

4. A process according to claim 1, wherein the phenol is a mixture of 2,6-xylenol and o-cresol.

5. A process according to claim 1, wherein the alcohol is methanol.

6. A process according to claim 1, wherein the alcohol is ethanol.

7. A process according to claim 1, wherein the manganese compound is manganese chloride.

8. A process according to claim 1, wherein the manganese compound is manganese acetate.

9. A process according to claim 1, wherein the manganese compound is manganese sulfate.

10. A process according to claim 1, wherein the manganese compound is potassium permanganate.

11. A process according to claim 1, wherein the primary amine is ethanolamine.

12. A process according to claim 1, wherein the primary amine is ethylenediamine.

13. A process according to claim 1, wherein the primary amine is at least one member selected from the group consisting of n-butylamine, cyclohexylamine, methylamine, and ethylamine.

14. A process according to claim 1, wherein the amount of the manganese compound is 0.05 to 30% by mole based on the monomer.

15. A process according to claim 1, wherein the amount of the primary amine is one or more moles per mole of the manganese compound.

16. A process according to claim 1, wherein the amount of the alcohol is one or more moles per mole of the manganese compound.

17. A process according to claim 1, wherein the reaction temperature is 0° to 150° C.

18. A process according to claim 1, wherein the oxygen is gaseous oxygen or air.

19. A process according to claim 1, wherein the phenol is at least one member selected from the group consisting of 2,6-xylenol, 2,6-dimethylphenol, a mixture of 2,6-xylenol and 2,5-xylenol, and a mixture of 2,6-xylenol and o-cresol.

20. A process for producing polyphenylene oxide compounds, which comprises reacting 2,6-xylenol with oxygen in the presence of a ternary catalyst system composed of manganese chloride, ethanolamine and methanol.

21. A process for producing polyphenylene oxide compounds, which comprises reacting 2,6-xylenol with oxygen in the presence of a ternary catalyst system composed of manganese chloride, ethylenediamine and methanol.

22. A process for producing polyphenylene oxide compounds, which comprises reacting 2,6-xylenol with oxygen in the presence of a ternary catalyst system composed of manganese acetate, ethanolamine and methanol.

23. A process for producing polyphenylene oxide compounds, which comprises reacting 2,6-xylenol with oxygen in the presence of a ternary catalyst system composed of manganese acetate, ethylenediamine and methanol.

References Cited

UNITED STATES PATENTS

| | | | |
|---|---|---|---|
| 3,337,501 | 8/1967 | Bussink et al. | 260—47 |
| 3,642,699 | 2/1972 | Cooper et al. | 260—47 |
| 3,306,875 | 2/1967 | Hay | 260—47 |

FOREIGN PATENTS

| | | |
|---|---|---|
| 1,560,562 | 2/1969 | France. |
| 3,195 | 1967 | Japan. |
| 30,355 | 1/1970 | Japan. |

MELVIN GOLDSTEIN, Primary Examiner